United States Patent [19]

Zavitsanos et al.

[11] 4,065,207
[45] Dec. 27, 1977

[54] PROGRAMMABLE POWER ATTENUATOR FOR CONTINUOUS $CO_2$ LASERS

[75] Inventors: Peter D. Zavitsanos, Norristown; Joseph A. Golden, Pennsburg; Frederick N. Alyea, King of Prussia, all of Pa.

[73] Assignee: The United States of America as represented by the Secretary of the Army, Washington, D.C.

[21] Appl. No.: 724,039

[22] Filed: Sept. 17, 1976

[51] Int. Cl.² ............................................. G02B 5/24
[52] U.S. Cl. ................................... 350/312; 350/318; 331/94.5 Q
[58] Field of Search ........................... 350/312, 318; 331/94.5 Q; 356/246, 183

[56] References Cited

U.S. PATENT DOCUMENTS

| | | | |
|---|---|---|---|
| 2,806,957 | 9/1957 | McDonald | 356/246 |
| 3,560,077 | 2/1971 | Sooy et al. | 350/312 |
| 3,572,907 | 3/1971 | Cindrich | 350/312 |
| 3,764,937 | 10/1973 | Skolnick et al. | 331/94.5 Q |
| 3,914,010 | 10/1975 | Zeller | 350/312 |

*Primary Examiner*—Jon W. Henry
*Attorney, Agent, or Firm*—William G. Gapcynski; Lawrence A. Neureither; Harold W. Hilton

[57] ABSTRACT

A device which will attenuate a 10.6 micron wave length light beam from 1–95% of the original intensity. The original intensity can be as high as 1000 watts. The unit is an absorption cell of variable path length filled with a gaseous mixture of sulfur hexafluoride and nitrogen at a total of one atmosphere. Power attenuation is accomplished by $SF_6$- absorption and energy exchange to $N_2$ or walls. The output is controlled by a motor which moves one of the two windows thus changing the absorption path.

2 Claims, 2 Drawing Figures

PROGRAMMABLE POWER ATTENUATOR FOR CONTINUOUS CO₂ LASERS

BACKGROUND OF THE INVENTION

There are two types of devices for variably controlling the quality and intensity of light passing through a fluid filled chamber. One type of device utilizes a fixed length chamber and the density or other properties of the fluid is modified to attenuate the light passed through. This type of device cannot be programmed. In the second type of device the capacity is changed, this thereby changes the light path by varying the distance between the reflective surfaces defining the ends of the chamber.

SUMMARY OF THE INVENTION

The device includes sections of steel hydraulic cylinder tubing which are fitted with germanium windows at the ends. The outer cylinder is fixed. A small electronic motor is attached on a lead screw which drives the inner cylinder back and forth inside the outer cylinder. This movement is used to vary the distance between the germanium windows and thereby changes the attenuation of the incident power. The incident beam enters the cell from the window of the outer cylinder which is fixed in position. If desired, the motor may be attached to a computer for controlling operation of the motor.

The inner cylinder and the germanium windows are fitted with rubber O ring seals so that the cell can be evacuated before admitting an $SF_6$-$N_2$ gas mixture. There are two ports in the wall of the outer cylinder. One is attached to a vacuum manifold in order to evacuate and fill the cell; the other is a vent which allows the gas mixture to be discharged to the atmosphere as the inner cylinder is moved inward from the fully extended postion.

DESCRIPTION OF THE PREFERRED EMBODIMENT

Figure 1:
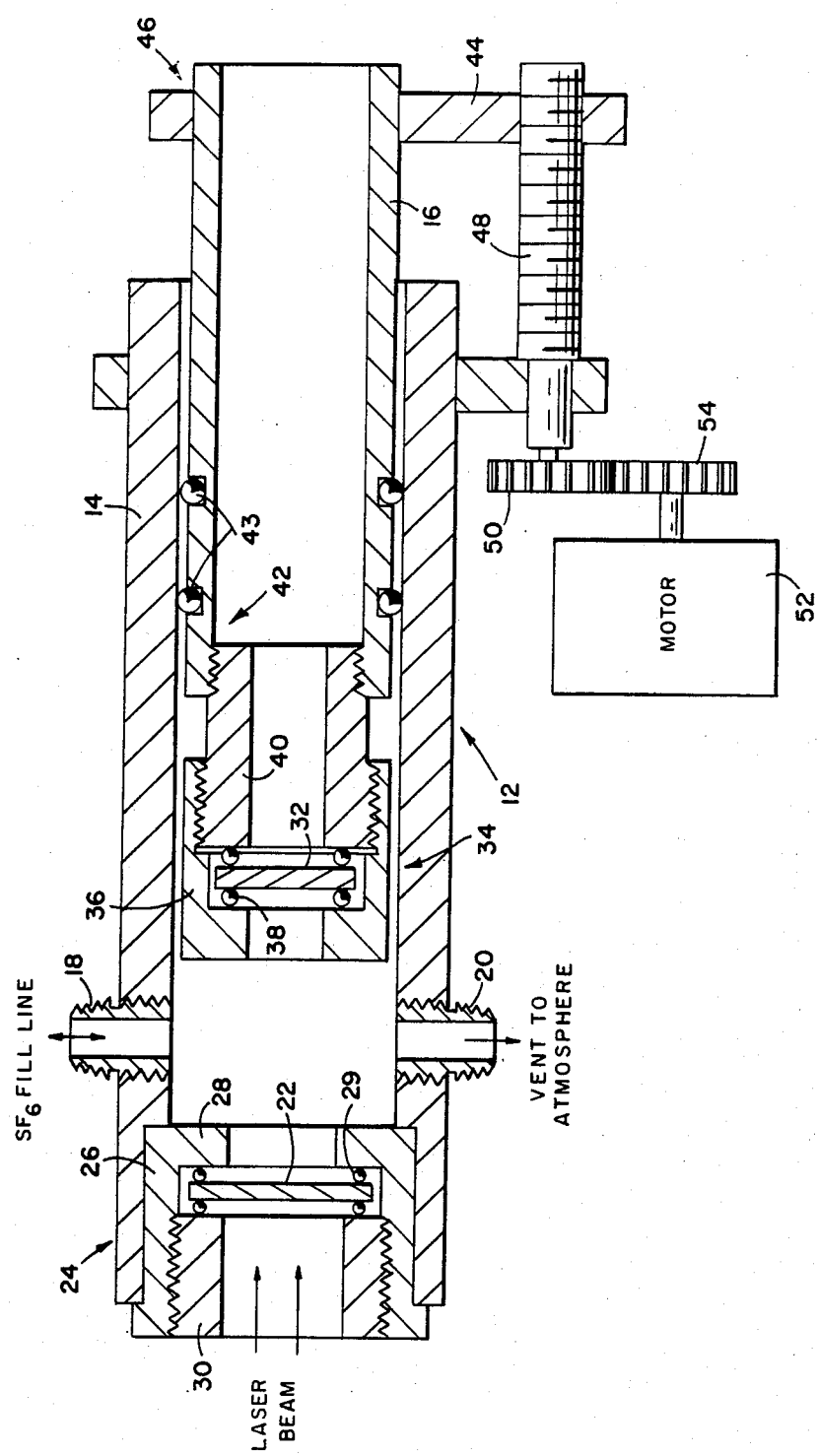
FIG. 1 is an elevational sectional diagrammatic view of the movable cylinders and controls therefor.

As seen in FIG. 1 attenuator 12 includes outer and inner cylinders 14 and 16, respectively. The outer cylinder is provided with a fill line 18 and a vent 20 for the $SF_6$. A germanium window 22 is fixedly secured to one end of 24 of cylinder 14. The window is mounted in a cylindrical member 26 against a flanged portion 28 thereof. A retainer 30 is threaded in member 26 for retention of window 22 therein. O ring seals 29 seal the window against leakage.

Cylindrical member 16 includes a germanium window 32 fixedly secured to one end 34 thereof. The window is mounted in a cylindrical member 36 against a flanged portion 38 thereof. A retainer 40 is threaded in member 36 for retention of window 32 therein. O ring seals 38 seal the window against leakage. The retainer 40 is threadably secured to cylinder 16 at end 42 thereof. O rings 43 seal cylilnder 16 within cylinder 14.

To move cylinder 16 in outer cylinder 14, a mounting member 44 is secured to end 46 of cylinder 16 and to a threaded shaft 48 which is connected to a gear 50 driven by a motor 52 through a second gear 54. The motor may be a constant speed motor or a step motor may be used to move the cylinder the desired distance. Solenoid valves, or the like (not shown), may be used to control gas flow into and out of the chamber responsive to volumetric changes thereof.

Figure 2:
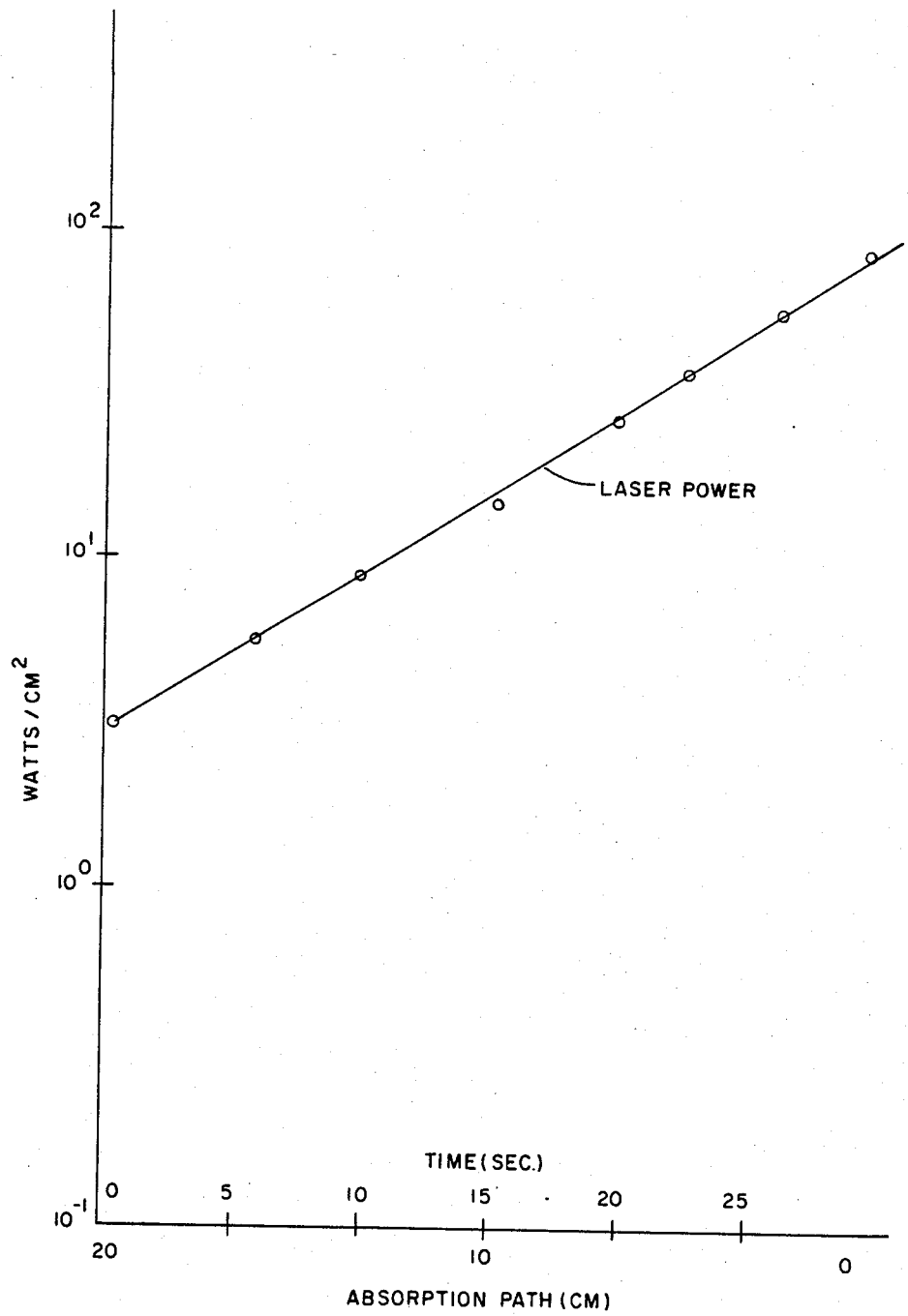
FIG. 2 is a graph illustrating the power attenuation achieved by the device of FIG. 1

FIG. 2 shows the power transmission through the cell as a function of cell path using 2 mm Hg $SF_6$ and 758 mm Hg $N_2$ to attenuate the incident radiation of 100 watts. By increasing the $SF_6$ partial pressure and flowing the gas mixture at a high rate it is possible to attenuate laser beams to the Kilowatt level. It is evident from FIG. 2 that the results follow an exponential curve and are in accord with the expression: % transmission = $e^{KX}$ which is the fundamental law describing the transmission of radiation through absorbing media, where X = absorption path, and K = absorption coefficient.

It should be noted that running the electric motor drive at constant speed produces an exponential transmission curve. In addition, however, the cell could be used to produce transmission versus time (rate length) curves of other forms using the appropriate programming.

We claim:

1. An optical cell of variable effective axial length comprising:
   a. an outer cylindrical cell having a fill and vent opening and a first transparent planar window fixedly secured to one end of said cylindrical cell;
   b. an inner cylindrical cell slidably carried in said outer cylindrical cell and having a second transparent planar window member secured therein to form a volume between said windows, said inner cylindrical cell including a first tubular member, a second tubular member having a first end in threaded relation with said first tubular member, a third tubular member having a first end in threaded relation with the second end of said second tubular member, the second end of said third tubular member being flanged with an opening therethrough, said flanged end being in spaced relation with the second end of said second tubular member to form a space therebetween to receive said second window therein;
   c. displacing means for moving said inner cylinder within said outer cylinder to vary the distance between said windows, said displacing means including a first support member secured to said inner cylinder, a second support member secured to said outer cylinder, a threaded shaft carried in said first and second support members, and, an electric motor disposed for rotation of said threaded shaft in said first and second support members to control the rate and distance said windows are separated thereby controlling the incident radiation passing through said windows; and,
   d. a radiation attenuating fluid disposed in said volume.

2. A device as set forth in claim 1 wherein said radiation attenuating fluid is a gaseous mixture of sulfur hexafluoride and nitrogen at a total of one atmosphere.

* * * * *